2 Sheets--Sheet 2.
T. O'BRYAN.
Machine for Cutting Corn-Stalks.
No. 165,496. Patented July 13, 1875.
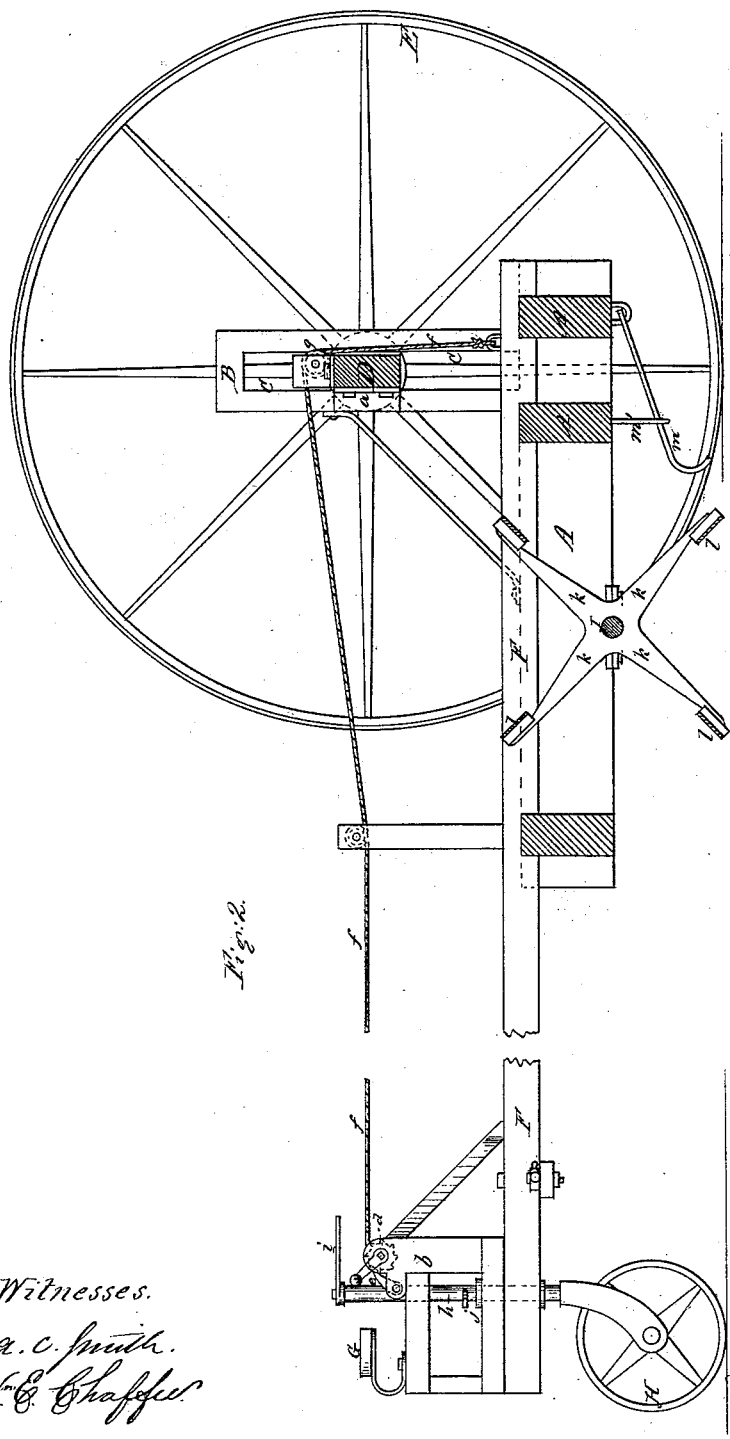
Witnesses.
G. a. c. Smith.
W. E. Chafee
Inventor
Terrence O'Bryan
By J. McC. Perkins
Attorney

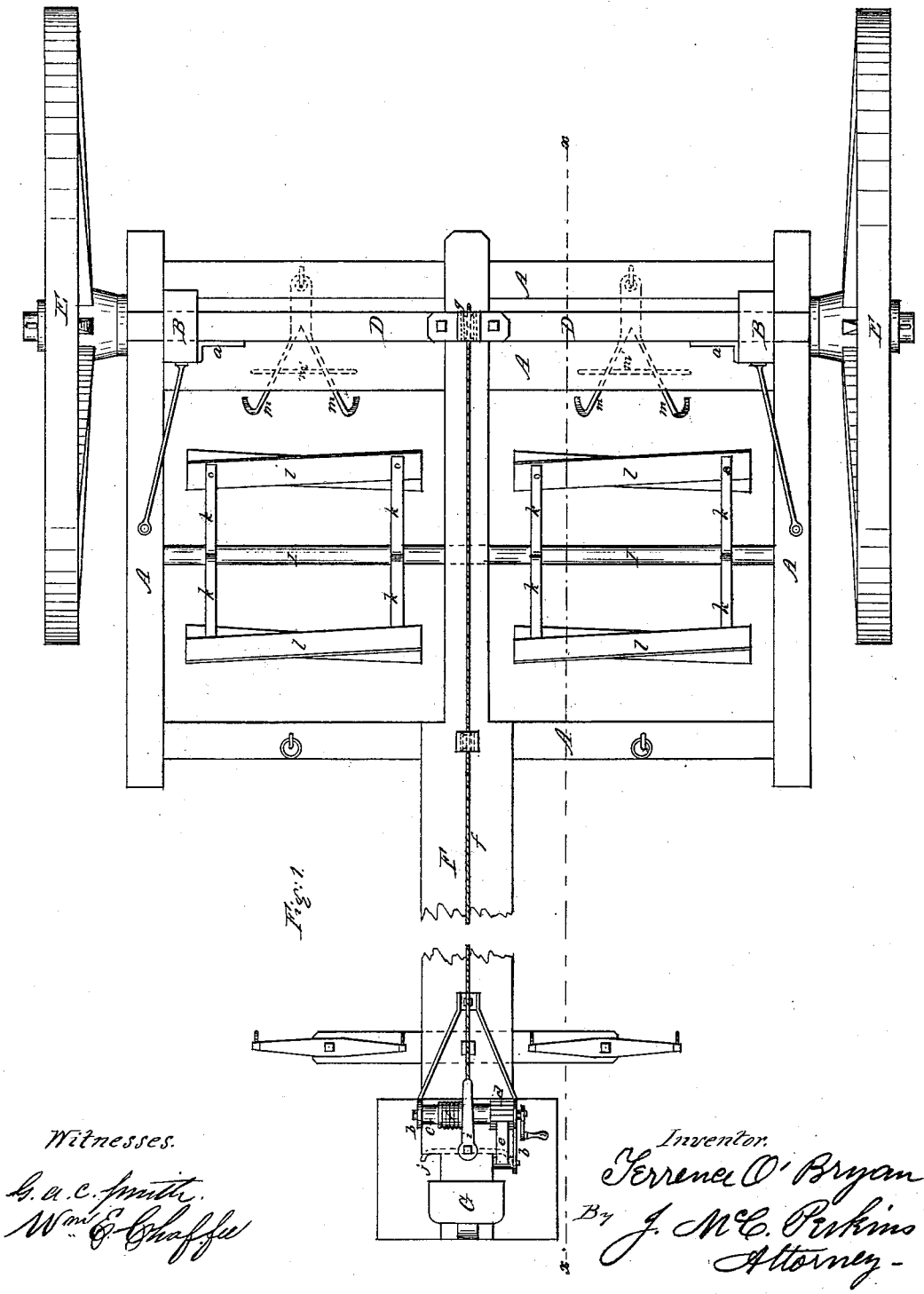

UNITED STATES PATENT OFFICE.

TERRENCE O'BRYAN, OF BARNARD, MISSOURI.

IMPROVEMENT IN MACHINES FOR CUTTING CORN-STALKS.

Specification forming part of Letters Patent No. 165,496, dated July 13, 1875; application filed November 10, 1874.

*To all whom it may concern:*

Be it known that I, TERRENCE O'BRYAN, of Barnard, in the county of Nodaway and State of Missouri, have invented an Improved Machine for Cutting Corn-Stalks, of which the following is a specification:

The nature of my invention consists in a corn-stalk cutter, constructed and arranged as hereinafter fully described.

In the accompanying drawing, Figure 1 represents a top view, and Fig. 2 a vertical section taken in the line $x$ $x$, Fig. 1, like letters designating like parts in each figure.

A is the frame, to which are secured two standards, B B, in each of which is a slot, C. The axle D passes through these slots, in which it is free to play up or down, and is kept in position by two guide-blocks, $a$ $a$, which are secured to it, and on each end of which are wheels E E. Attached to the frame A is a piece, F, which extends backward, and on its rear end is the driver's seat G. To this piece whiffletrees are attached for fastening the horses to, they being placed between the driver's seat and frame A. In front of the driver's seat, and secured to the piece F, is a frame, $b$ $b$, in which is a windlass, $c$, and on one end of it is a ratchet-wheel, $d$, and pivoted to the frame $b$ is a pawl, $e$, which engages with the ratchet-wheel, holding the windlass in any desired position. To the windlass $c$ is attached a rope, $f$, which extends forward above the piece F, over a pulley, $g$, (which is secured to and over the axle D,) thence down to the front end of said piece F, to which it is fastened. Under the driver's seat is a caster-wheel, H, the vertical shaft of which extends up through the piece F in front of the driver's seat. On the upper end of this shaft is a hand-lever, $i$, by means of which the driver is enabled to guide the machine in any desired direction. On this shaft is also a foot-lever, $j$, which can be used to turn the caster-wheel. In the frame A is a shaft, I, on which are radiating arms $k$, and on their ends are secured knives $l$. On the under side of the front cross-bar of the frame A are hinged forked hooks $m$, which hold the stalks down while they are being cut. These hooks are prevented from dragging on the ground by a frame or guard, $m'$, on the under side of the cross-bar next to the front one.

The operation of the machine is as follows: As the machine is driven forward, the corn-stalks are held down by the hooks $m$, and are cut by the knives $l$, which are made to rotate by their striking the ground as the machine is moved forward. As will be seen in the drawing, there are two sets of knives, one in front of each horse, thereby cutting two rows at the same time, and the horses, being back of the cutters, walk only where the stalks have been cut. When it is desired to raise the cutters from the ground, it is done by the driver turning the windlass, which will wind the rope $f$ around it, thereby raising the frame A, and with it the cutter. The machine, then, resting on its wheels, can be moved in any direction without any movement of the operating parts, the rope being securely held, meantime, by means of the ratchet $d$ and pawl $e$.

What I claim as new, and desire to secure by Letters Patent, is—

1. The combination of the frame A, guide-standards B B, axle D, beam F, wheel H, and rotary cutters, substantially as described.

2. The windlass $c$, combined with axle D, standards B B, frame and bar A F, and wheel H.

In witness that I claim the foregoing, I have hereunto set my hand this 5th day of September, 1874.

T. O'BRYAN.

Witnesses:
 FREDERICK STOEP,
 JOHN MOULL.